US009727135B2

(12) United States Patent
Sellen et al.

(10) Patent No.: US 9,727,135 B2
(45) Date of Patent: Aug. 8, 2017

(54) GAZE CALIBRATION

(71) Applicant: Microsoft Technology Licensing, LLC, Redmond, WA (US)

(72) Inventors: Abigail Jane Sellen, Cambridge (GB); Adam Gary Emfield, Oviedo, FL (US); Arridhana Ciptadi, Atlanta, GA (US); Kenneth Robert Woodberry, Cambridge (GB); Andrew Blake, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 14/265,391

(22) Filed: Apr. 30, 2014

(65) Prior Publication Data

US 2015/0316981 A1 Nov. 5, 2015

(51) Int. Cl.
*G06F 3/01* (2006.01)
*G06K 9/00* (2006.01)
*H04N 17/00* (2006.01)

(52) U.S. Cl.
CPC ........... *G06F 3/013* (2013.01); *G06K 9/0061* (2013.01); *H04N 17/002* (2013.01)

(58) Field of Classification Search
CPC ...................................................... G06F 3/013
See application file for complete search history.

(56) References Cited

U.S. PATENT DOCUMENTS 6,152,563 A * 11/2000 Hutchinson ............ A61B 3/113
351/209

| 7,657,062 | B2 | 2/2010 | Pilu |
| 2004/0075645 | A1 | 4/2004 | Taylor et al. |
| 2005/0225723 | A1* | 10/2005 | Pilu ........................ A61B 3/113 |
| | | | 351/209 |

(Continued)

FOREIGN PATENT DOCUMENTS

| GB | 2504492 A | 2/2014 |
| WO | 2012052061 A1 | 4/2012 |
| WO | 2013059940 A1 | 5/2013 |

OTHER PUBLICATIONS

"International Search Report & Written Opinion Received for PCT Patent Application No. PCT/US2015/027407", dated Jul. 16, 2015, 13 Pages.

(Continued)

*Primary Examiner* — Amare Mengistu
*Assistant Examiner* — Shawna Stepp Jones
(74) *Attorney, Agent, or Firm* — Lee & Hayes, PLLC

(57) ABSTRACT

Calibration of gaze tracking equipment is described, for example, in a desktop computing scenario. In various examples, an explicit calibration phase is carried out, optionally followed by an implicit calibration phase. In examples, the explicit calibration phase comprises requesting and receiving user manual input events associated with specified locations and measuring gaze associated with the manual input events. In examples, the implicit calibration phase is carried out without disturbing other activity of a user in the desktop computing environment, such as operating a graphical user interface. In various examples calibration data is stored in a plurality of buffers and used to control switching between explicit and implicit calibration phases.

15 Claims, 6 Drawing Sheets

(56) References Cited

U.S. PATENT DOCUMENTS

2009/0146950 A1* 6/2009 Maringelli .......... G06F 19/3406
345/158
2011/0310006 A1* 12/2011 Edwards ................ A61B 3/113
345/156

OTHER PUBLICATIONS

L. C. Brolly, Xavier, et al., "Implicit Calibration of a Remote Gaze Tracker", In Conference on Computer Vision Pattern Recognition Workshop, Jun. 2, 2004, 9 pages.
Sugano, Yusuke, et al., "An Incremental Learning Method for Unconstrained Gaze Estimation", In Proceedings of 10th European Conference on Computer Vision: Part III, Oct. 12, 2008, 12 pages.
Nguyen, Phibang, et al., "Calibration-Free Gaze Tracking using Particle Filter", In IEEE International Conference on Multimedia and Expo (ICME), Jul. 15, 2013, 6 pages.
Vidal, Melodie, et al., "Pursuits: Spontaneous Interaction with Displays based on Smooth Pursuit Eye Movement and Moving Targets", In Proceedings of ACM International Joint Conference on Pervasive and Ubiquitous Computing, Sep. 8, 2013, 10 pages.
Pfeuffer, Ken, "Pursuit Calibration: Making Gaze Calibration Less Tedious and More Flexible", In Proceedings of the 26th Annual ACM Symposium on User Interface Software and Technology, Oct. 8, 2013, 9 pages.

* cited by examiner

GAZE CALIBRATION

BACKGROUND

The use of gaze trackers (also referred to as eye trackers) in human-computer interaction is becoming more feasible now that gaze tracking systems are becoming more portable and affordable. However, existing gaze trackers require calibration in order to work effectively. Typically, calibration requires a user to fixate on a sequence of points before a gaze tracker can be used. Over time, the system may need recalibrating, especially if the user moves around (leaves their desk), or if ambient conditions change, such as lighting levels. All of this is disruptive to a user's work or other activities, and makes the use of gaze tracking either cumbersome or distracting, or simply inaccurate.

Gaze trackers measure changes in gaze direction of a subject, such as a person operating a computing device. The point of gaze is the point where a subject is looking and the gaze direction is the direction of a line of sight from the eye to the point of gaze. Thus to compute gaze direction, information about head or eye location is used. This may be achieved by fixing the head location at a known place, using a bite bar, a forehead support or similar apparatus. Where the head is free to move, the head position and/or eye location is tracked, using image data or in other ways.

Many types of gaze tracker are known including those which measure movement of an object attached to the eye (such as a special contact lens), those which use optical methods for measuring eye motion, and those which measure electric potentials around the eyes. Where gaze direction is measured using any of these types of gaze tracker, calibration is an ongoing problem.

The embodiments described below are not limited to implementations which solve any or all of the disadvantages of known gaze tracker calibration systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Calibration of gaze tracking equipment is described, for example, in a desktop computing scenario. In various examples, an explicit calibration phase is carried out, optionally followed by an implicit calibration phase. In examples, the explicit calibration phase comprises requesting and receiving user manual input events associated with specified locations and measuring gaze associated with the manual input events. In examples, the implicit calibration phase is carried out without disturbing other activity of a user in the desktop computing environment, such as operating a graphical user interface. In various examples calibration data is stored in a plurality of buffers and used to control switching between explicit and implicit calibration phases.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples described below involve desktop computing deployments as in this type of environment remote gaze trackers, which use optical methods, are currently most effective. As mentioned above, eye and/or head position information may be used to compute gaze direction where optical gaze trackers are used. The distance of the subject's eyes from the gaze tracker may be monitored. Tracking head and/or eye position and/or distance from the gaze tracker can currently be achieved with good, workable levels of accuracy, where the subject is sitting at a desk using a desktop computer. This is because the subject is relatively static as compared with situations where the subject is operating a smart phone, tablet computer or other portable computing device. Thus the examples described in this document may be applicable to computing deployments involving portable computing devices, video conferencing deployments, large screen computing deployments (where the display is on a living room wall or similar) or other computing deployments, in cases where the gaze tracker is able to cope with movement of the subject. For example, where the gaze tracker is head mounted, eye mounted, or where the gaze tracker uses new technology to accurately and effectively deal with movement of the subject.

Figure 1:
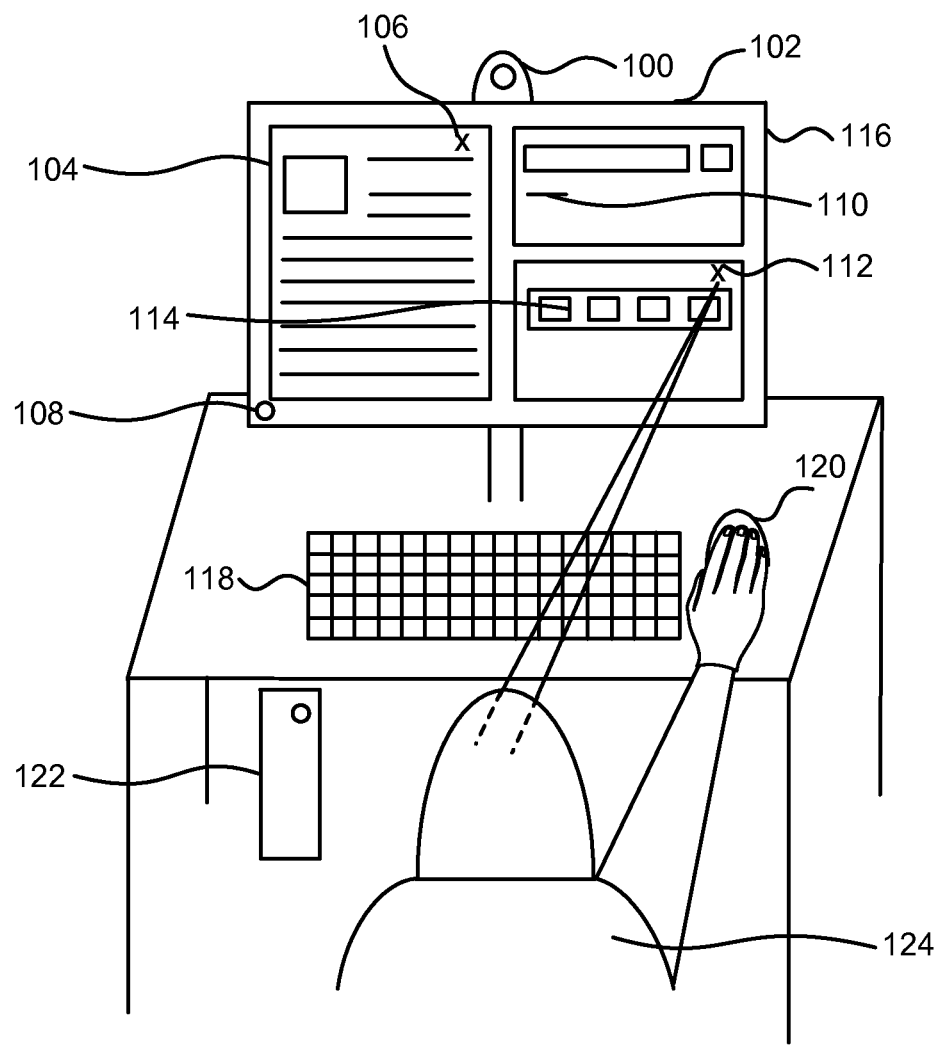
FIG. 1 is a schematic diagram of a gaze tracker in a desktop computing deployment.

FIG. 1 shows a subject 124 sitting at a desk and operating a desktop computer 122 having a display screen 102, a keyboard 118 and a mouse 120. Mounted on the display screen is an optical gaze tracker 100 arranged to monitor changes in gaze direction of the subject 124.

The optical gaze tracker is of any type which is able to remotely monitor changes in gaze direction of the subject. For example, the optical gaze tracker may emit diffuse infrared illumination which is reflected from the eye of the subject. An image capture device in the gaze tracker captures a stream of images of the subject and the reflected infrared light. The image capture device may be a video camera or a specially designed optical sensor for example. The stream of images are analyzed at the gaze tracker to detect features in the images and track the relative position of the features in the sequence of image frames. For example, the features may be corneal reflections, reflections from the lens of the subject's eye, retinal blood vessels, the center of the pupil or other features. The gaze tracker may also compute the head position, eye position and the distance of the subject from the gaze tracker, on the basis of the images. The gaze tracker may store values of parameters such as eye separation distance and other parameters which are to be calibrated. Calibration may comprise features obtained from the eyes (such as eye image, infra-red reflection image and other features obtained from the eyes) being associated with a known gaze-point location on a monitor or other display.

Using the tracked feature positions and the parameter values the gaze tracker computes gaze direction and outputs a stream of gaze points which are 2D positions in a coordinate system of the display 116. The gaze tracker also outputs the distance of the subject from the gaze tracker. The accuracy of the values output by the gaze tracker depends on the effectiveness of the calibration.

Existing gaze calibration processes, may be inaccurate. Reasons for this are, for example, that the user is not looking directly at the calibration marker, that the user blinks during the calibration process, or that the user moves during the calibration process. It is recognized herein that significant inaccuracy occurs when users are not able to look consistently and directly at individual markers in a sequence of calibration markers during an explicit calibration process. An explicit calibration process is one during which a user is aware that calibration is taking place. For example, during explicit calibration the user actively looks at display markers, presented for the specific purpose of calibration. The examples described herein give a more accurate method of calibration. For example, by using a combination of manual input and gaze measurements it has been unexpectedly found that calibration accuracy is significantly improved. For example, by having a user click on a calibration marker, as well as fixating his or her gaze on the calibration marker, accuracy of calibration is improved. This is thought to be because the user more consistently fixates the calibration marker when he or she also has to make manual input. It is found that more consistent and accurate gaze occurs because the user has a hand-eye coordination task rather than a task involving only gaze. Other types of manual input may be used such as stylus pen touches on a touch screen, where the manual input is capable of fine resolution. Various examples in this document seek to address the problem that the user is sometimes not looking at the correct location during calibration, which is very important since it is hard to constantly pay attention to the calibration markers during the whole calibration process. In examples the gaze tracking system can actually get the data that it needs for calibration almost instantly given that it picks the right moments to gather the data, so the user doesn't have to stay focused constantly though the calibration step. In some examples a point-and-click approach to explicit calibration reduces pressure on the user to always focus intently during the whole calibration step since data is only gathered during the 'click' moment. A point-and-click approach to explicit calibration may forces the user to actually look at the physical location of a calibration marker, thus improving quality of calibration data. Empirical tests show, that where two calibration markers are used, calibration error in visual degrees drops from just under 2.5 to just over 1 when a point-and-click method as described herein is used. Where 5 calibration markers are used this drop is from 2.5 to just under 1 visual degree. Where 9 calibration markers are used this drop is from 1.8 to 0.7 visual degrees.

As mentioned above, explicit calibration is typically disruptive to a user's work or other activities, and makes the use of gaze tracking either cumbersome or distracting, or simply inaccurate. At least some of the examples described in this document use a combination of explicit and implicit calibration processes. Implicit calibration captures naturally occurring calibration data whilst a user is active on another task, such as operating a graphical user interface. Implicit calibration occurs in the background, without disrupting a user from his or her current task. Previous implicit calibration processes have been found inaccurate. By using a combination of explicit and implicit calibration as described herein improved accuracy is found. In addition, the overall calibration process is more robust to changes in the environment such as lighting changes, movement of objects in the environment, movement of the user and changes in other factors. Where a combination of different types of process are used in series, it is not straightforward to control switching between the types of process in a manner that results in good working results. At least some of the examples described below indicate how this switching control may be achieved.

The example of FIG. 1 shows a graphical user interface at the display 116. In this example, the graphical user interface comprises three windows. One of the windows 104 contains text and an image; this window has an icon 106 in the top right corner which the user may select to close the window. Another of the windows has a search query input box and a search result comprising a hyperlink 110. Another of the windows has a horizontal menu of icons 114 and an icon 112 in the top right corner which the user may select to close the window. The graphical user interface may comprise icons with known locations such as icon 108 which may be used to launch applications.

In the example of FIG. 1 the user is selecting icon 112 using mouse 120 and the user is also looking at icon 112 as indicated by the lines of sight from the user's eyes to icon 112. In this way, calibration data may be obtained by recording gaze measurements from the gaze tracker 100 during the time when the user selects icon 112. As the 2D location of icon 112, in the display coordinate system, is known an "expected click location" derived from the 2D location of icon 122 may be associated with the gaze measurements to obtain calibration data. The calibration data comprises a pair of values, the measured gaze point and the expected click location. The calibration data may also comprise a tracked estimated gaze point location as described in more detail below. The expected click location may be a point within the icon at which the user is expected to click, such as the center of the icon, or another location in the icon. In this way calibration data is implicitly obtained without disrupting the user's activity. This is because the user's activity involves selecting icon 112 anyway. In a similar way, calibration data may be obtained for other graphical user interface items that a user manually selects. Types of graphical user interface items which may be used include, but are not limited to: hyperlinks (such as hyperlink 110), close, restore and minimize buttons, menu icons 114, application launch icons 108, and others. Graphical user interface icons which are of fine detail may be used for increased accuracy as the expected click location is known to a finer resolution.

Figure 2:
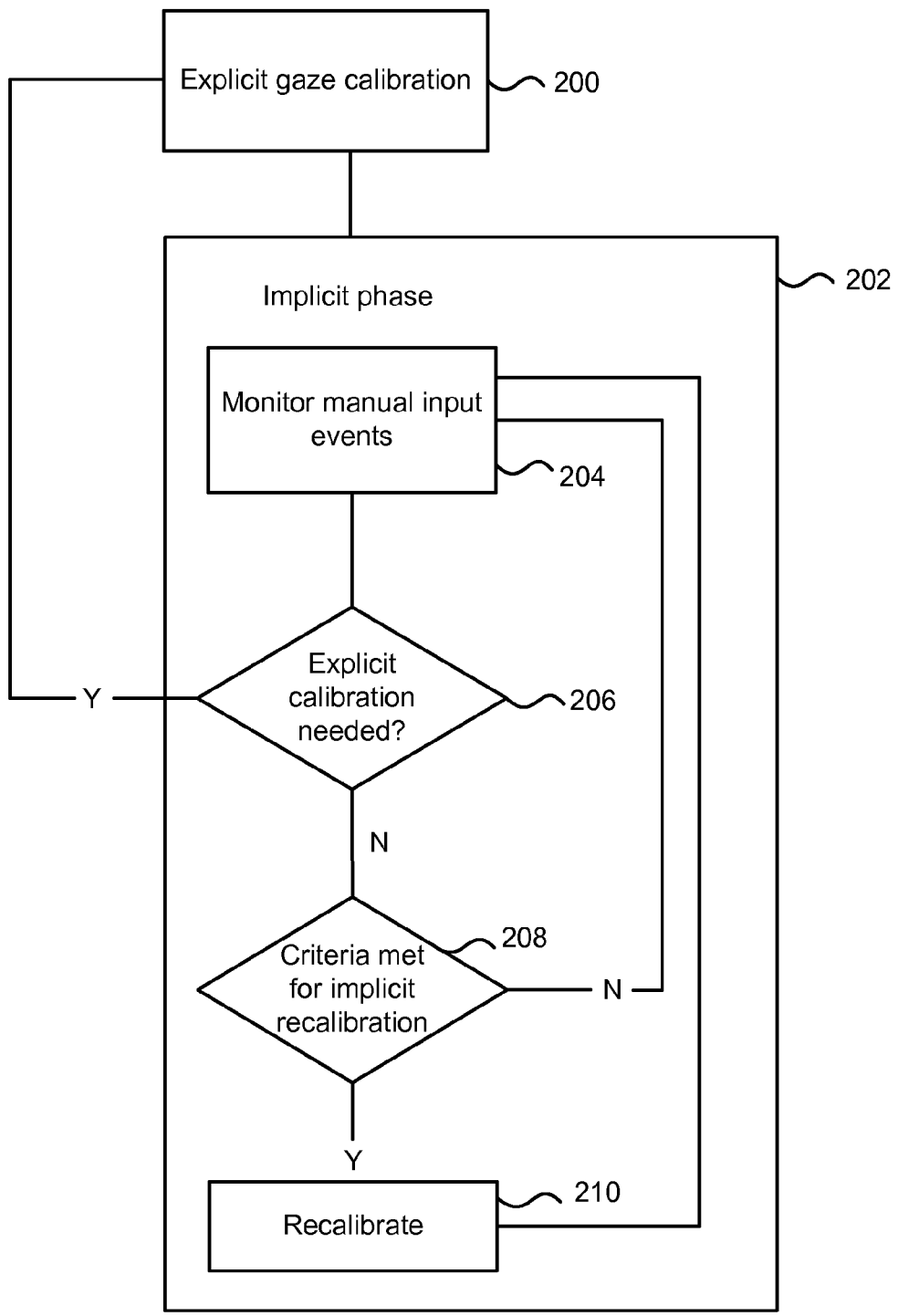
FIG. 2 is a flow diagram of a method of calibrating a gaze tracker such as the gaze tracker of FIG. 1.

FIG. 2 is a flow diagram of a method of calibrating a gaze tracker such as the gaze tracker of FIG. 1. The method uses a combination of explicit and implicit calibration. This method may be executed by a calibration module at the gaze tracker and/or at a computing device such as the desk top computer 122 of FIG. 1). The calibration module is computer implemented using software and/or hardware.

On start-up, an explicit calibration phase 200 is carried out. Subsequent to the explicit calibration phase 200 an implicit calibration phase 202 occurs. A switch back to the explicit calibration phase 200 may occur depending on one or more criteria, rules or thresholds.

During the implicit calibration phase 202 the calibration module monitors 204 manual input events such as mouse clicks. The calibration module checks whether explicit calibration is needed 206 on the basis of at least some of the monitored manual input events (and gaze measurements associated with the manual input events). If explicit calibration is needed the process returns to the explicit gaze calibration step 200. The calibration module may also monitor user input and if user input is received requesting explicit calibration, then the process returns to step 200.

If explicit calibration is not needed, the calibration module checks if criteria are met for implicit recalibration 208. For example, by checking if suitable data is available for the recalibration. If the criteria are not met the calibration module continues to monitor for more manual input events at step 204. If the criteria are met, recalibration occurs at step 210. After recalibration the process returns to the monitoring step 204.

In this way, an effective combination of explicit and implicit calibration is achieved in a robust, workable manner.

Figure 3:
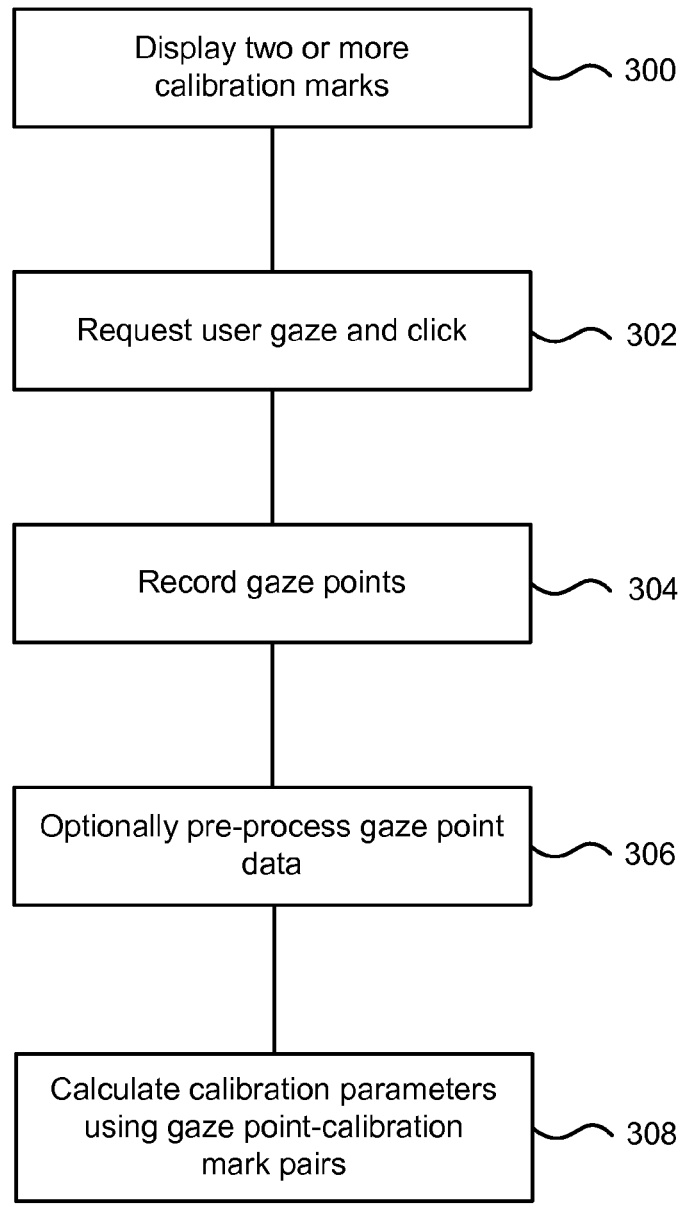
FIG. 3 is a flow diagram of a method of explicit gaze calibration, such as the explicit calibration phase of FIG. 2 in more detail.
Figure 4:
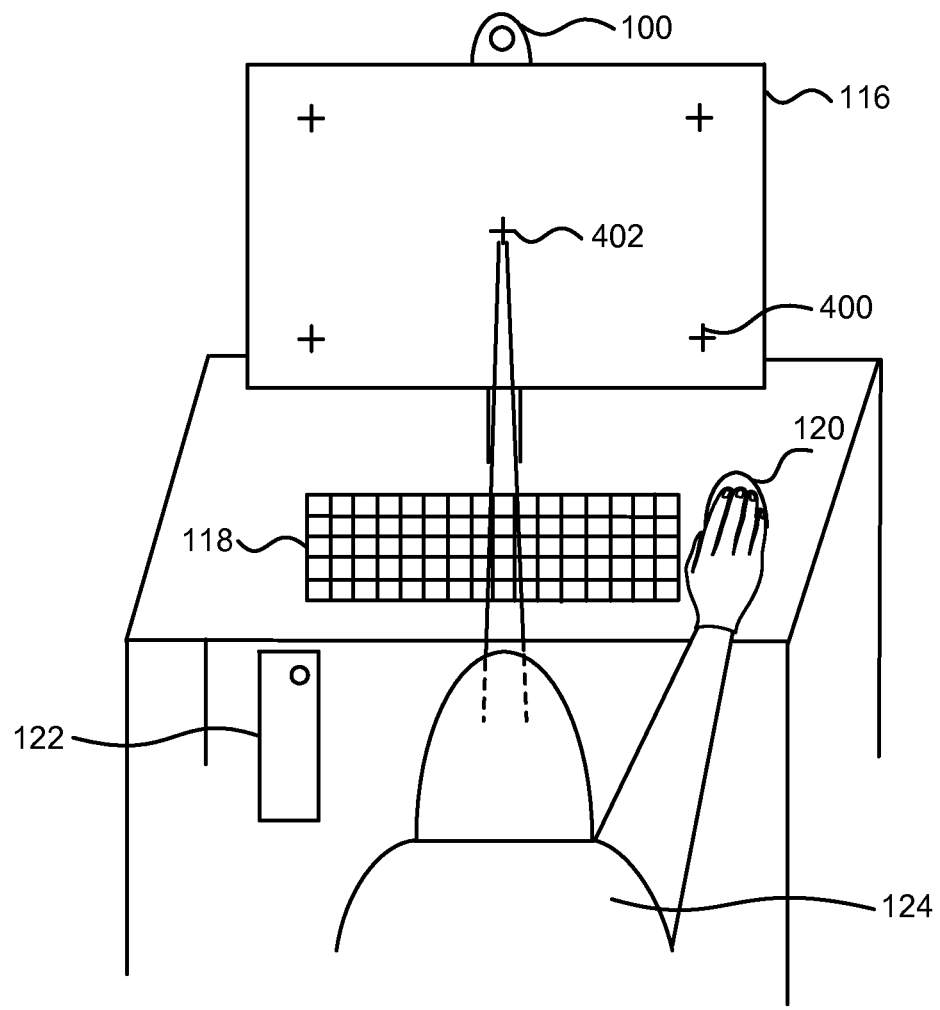
FIG. 4 is a schematic diagram of the desktop computing deployment of FIG. 1 during an explicit gaze calibration process such as that of FIG. 3.

More detail about the explicit gaze calibration step 200 of FIG. 2 is now given with respect to FIG. 3 and FIG. 4. The process of FIG. 3 may also be a stand-alone process in examples where explicit gaze calibration is used without implicit gaze calibration.

Two or more calibration marks 400 are displayed at display 116. The calibration marks may be displayed simultaneously (as shown in FIG. 4) or in sequence. The user is requested to gaze at and click with a mouse (or make other manual input) the calibration marks. For example, a pop up window on the display gives a text message to the user asking them to gaze and click. Gaze points (2D display coordinates) from the gaze tracker 100 are recorded 304 during the manual user input events.

The gaze point data from the gaze tracker 100 is optionally pre-processed 306, for example, to remove noise, to remove outliers where the user may have blinked or slipped the mouse, or to aggregate data over a time window containing the manual user input event.

The calibration module calculates 308 calibration parameters using the gaze point data and the associated positions of the calibration marks 400. The calibration parameters are stored and used for ongoing interpretation of output from the gaze tracker 100.

Figure 5:
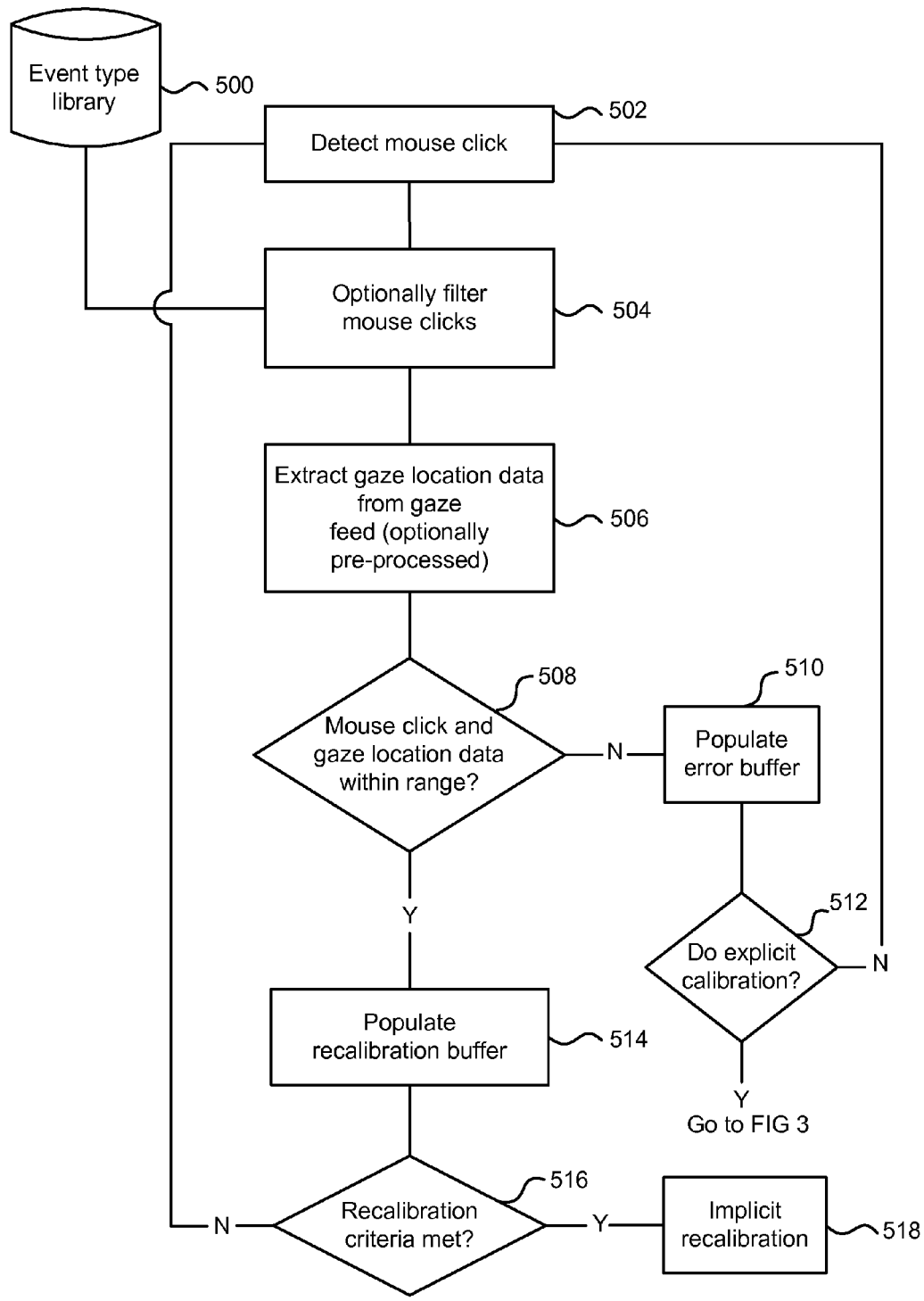
FIG. 5 is a flow diagram of a method of implicit gaze calibration which such as that of FIG. 2 in more detail.

FIG. 5 is a flow diagram of a method of implicit gaze calibration such as that of FIG. 2 in more detail. This method may be executed by the calibration module.

The method of FIG. 5 is explained with reference to mouse clicks. However, it is also applicable to other types of manual user input events such as stylus pen touch inputs.

The calibration module detects mouse clicks 502, for example, a stream of mouse clicks is detected. The stream of mouse clicks is optionally filtered 504 to select mouse clicks associated with a graphical user interface item of a specified type, or which meets specified criteria such as size or scale (such as resolution, or incorporation of fine detail). These criteria and/or types may be stored in an event type library 500 accessible to the calibration module.

The calibration module extracts 506 gaze location data from a gaze feed (received from the gaze tracker). The gaze location data may be in the form of 2D coordinates. The calibration module may convert the 2D coordinates from the gaze feed into visual angles using information about the distance of the user from the gaze tracker (this information is available from the gaze tracker).

The calibration module checks 508 whether the gaze location data and mouse click location are within a specified range of one another. For example, the range may be related to a size, in visual angles, of a foveal region of a user.

If the gaze location and mouse click location are within range, these locations are stored in a recalibration buffer. That is, the data is used to populate a recalibration buffer 514.

If the gaze location and mouse click location are not within range of one another, these locations are stored in an error buffer 510. When a specified amount of data is stored in the error buffer explicit calibration is triggered by decision point 512 in FIG. 5 and the buffer is flushed.

The calibration module checks whether recalibration criteria are met at check point 516 of FIG. 5. For example, the contents of the recalibration buffer are inspected to check one or more criteria such as: number of entries, spatial distribution of entries. If the recalibration criteria are met implicit recalibration occurs 518 which involves updating calibration parameter values and flushing the recalibration buffer. If recalibration criteria are not met the module returns to step 502 of detecting mouse clicks.

The functionality of the calibration module described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 6:
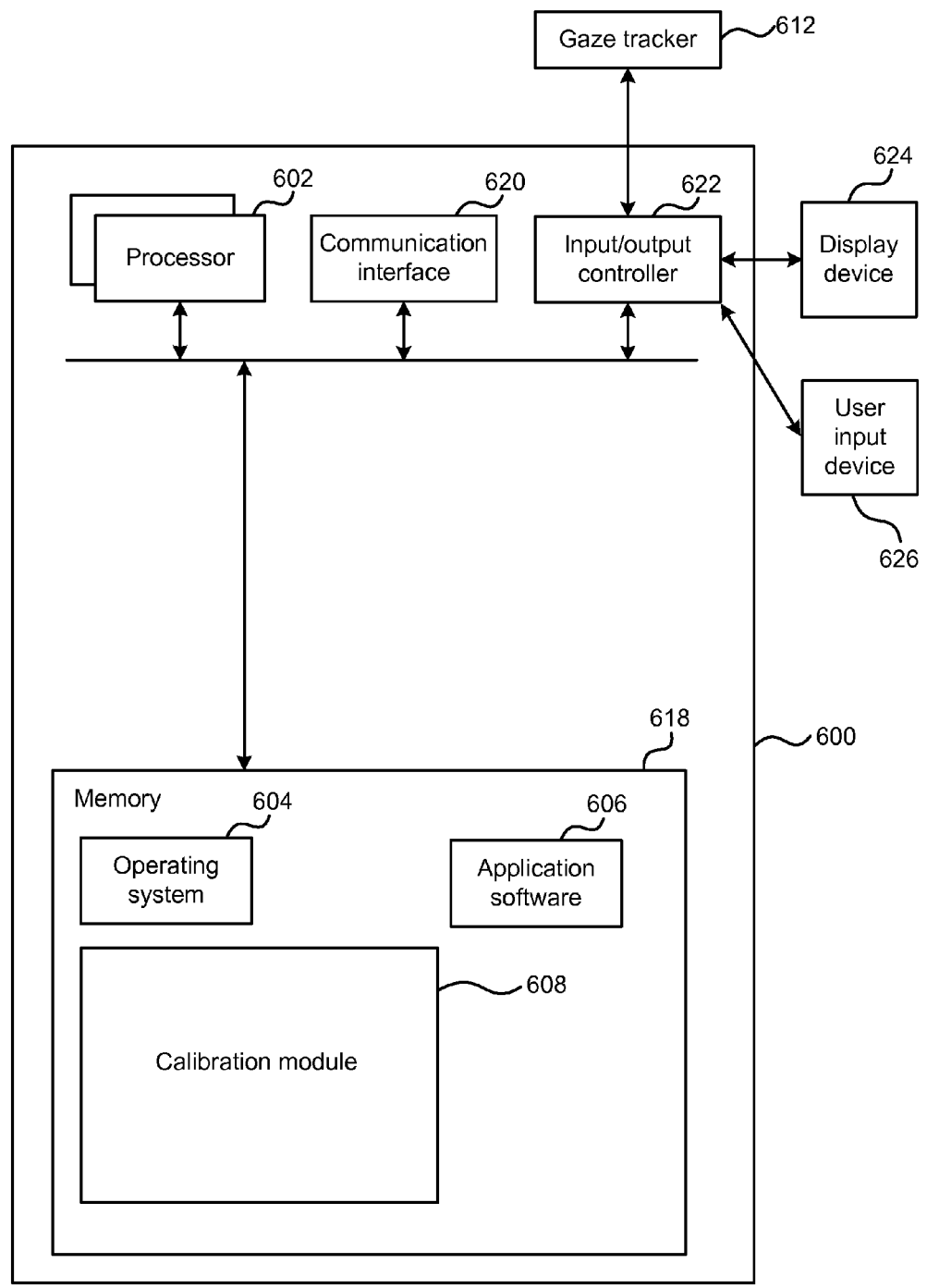
FIG. 6 illustrates an exemplary computing-based device in which embodiments of a gaze calibration system may be implemented.

FIG. 6 illustrates various components of an exemplary computing-based device 600 which may be implemented as any form of a computing and/or electronic device, and in which embodiments of gaze calibration may be implemented.

Computing-based device 600 comprises one or more processors 602 which may be microprocessors, controllers or any other suitable type of processors for processing computer executable instructions to control the operation of the device in order to calibrate gaze measurements from a gaze tracker. In some examples, for example where a system on a chip architecture is used, the processors 602 may include one or more fixed function blocks (also referred to as accelerators) which implement a part of the method of gaze calibration in hardware (rather than software or firmware). Platform software comprising an operating system 604 or any other suitable platform software may be provided at the computing-based device to enable application software 606 to be executed on the device. At least some of the application software 606 is arranged to render a graphical user interface at a display device 624 connected to the computing based device 600. In some examples, at least some of the application software is arranged to use input from a gaze tracker to control the computing based device 600. A calibration module 608 at the computing based device is arranged to implement the methods of some or all of FIGS. 2, 3 and 5. In some examples the calibration module is integral with operating system 604 in whole or in part. Where the calibration module is integral with the operating system 604 calibrated gaze data is available at the operating system level.

The computer executable instructions may be provided using any computer-readable media that is accessible by computing based device 600. Computer-readable media may include, for example, computer storage media such as memory 618 and communications media. Computer storage media, such as memory 618, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 618) is shown within the computing-based device 600 it will be appreciated that the storage may be distributed or located remotely and accessed via a network or other communication link (e.g. using communication interface 620).

The computing-based device 600 also comprises an input/output controller 622 arranged to output display information to a display device 624 which may be separate from or integral to the computing-based device 600. The display information may provide a graphical user interface. The input/output controller 622 is also arranged to receive and process input from one or more devices, such as a gaze tracker 612 and a user input device 626 (e.g. a mouse, keyboard, camera, microphone or other sensor). In some examples the user input device 626 may detect voice input, user gestures or other user actions and may provide a natural user interface (NUI). This user input may be used to request explicit calibration or for other purposes. In an embodiment the display device 624 may also act as the user input device 626 if it is a touch sensitive display device. The input/output controller 622 may also output data to devices other than the display device, e.g. a locally connected printing device.

Any of the input/output controller 622, display device 624 and the user input device 626 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In the example of FIG. 6 the calibration module 608 is located at the computing based device 600. It is also possible for the calibration module to be located, in whole or in part, at the gaze tracker 612.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
   receiving, from a gaze tracker, a stream of gaze measurements of a user operating a computing device having a display;
   carrying out an explicit calibration phase which includes:
      displaying a plurality of calibration markers at the display;
      detecting, at the computing device, a plurality of manual user input events associated with the calibration markers;
      identifying a plurality of the gaze measurements associated with at least some of the detected manual user input events; and
      calibrating the stream of gaze measurements using the identified plurality of gaze measurements and locations of the associated manual user input events; and
   carrying out an implicit calibration phase to recalibrate the stream of gaze measurements, the implicit calibration phase being executed without disturbing other interactions of the user with the computing device and the implicit calibration phase including:
      detecting, at the computing device, a manual user input event associated with a location of the display;
      identifying, from the stream of gaze measurements, a gaze measurement associated with the manual user input event;
      checking if the location associated with the manual user input event is within a range of the gaze measurement; and
      populating a recalibration buffer with an indication of the location and the gaze measurement in response to the location being within a range of the gaze measurement.

2. The method of claim 1 comprising repeating the explicit calibration phase on the basis of monitored manual input events or when user input requesting explicit calibration is received.

3. The method of claim 1, further comprising determining that one or more entries in the recalibration buffer meet one or more spatial distribution criteria and using the one or more entries for recalibration.

4. The method of claim 1 further comprising populating an error buffer with an indication of location and the gaze measurement in response to the location being outside a range of the gaze measurement.

5. The method of claim 4 further comprising triggering a repetition of the explicit calibration phase based at least in part on the indication of the location and the gaze measurement in the error buffer.

6. The method of claim 1 where the manual user input events are mouse clicks or stylus touches.

7. The method of claim 1 further comprising filtering manual user input events according to types and/or scale of graphical user interface item associated with the manual user input events.

8. The method of claim 1 further comprising filtering the stream of measurements to remove noise or outliers.

9. A computer-implemented method comprising:
   receiving, from a gaze tracker, a stream of gaze measurements of a user operating a computing device having a display;
   carrying out an explicit calibration phase including:
      obtaining measurements from the stream during a hand-eye coordination task of the user, the task involving user input at a plurality of calibration markers on the display; and
   carrying out an implicit calibration phase including:
      obtaining measurements from the stream during operation, by the user, of a graphical user interface at the display;
      determining that locations of the user input are outside a range of associated measurements;
      in response to determining that the locations of the user input are outside the range of the associated measurements:
         populating an error buffer with indications of the locations and the associated gaze measurements; and
         triggering a repetition of the explicit calibration phase based at least in part on contents of the error buffer.

10. The computer-implemented method of claim 9, wherein triggering a repetition of the explicit calibration phase is based at least in part on at least one of an insufficient number of entries in the error buffer or an average spatial distribution between indications of the locations and the associated gaze measurements exceeding a threshold.

11. A computer-implemented gaze calibration module comprising:
   an input interface arranged to receive, from a gaze tracker, a stream of gaze measurements of a user operating a computing device having a display;
   a recalibration buffer;
   a processor arranged to carry out:
      an explicit calibration phase including:
         displaying a plurality of calibration markers at the display;
         detecting, at the computing device, a plurality of manual user input events associated with the calibration markers;
         identifying a plurality of the gaze measurements associated with at least some of the detected manual user input events; and where the processor is arranged to calibrate the stream of gaze measurements using the identified plurality of gaze measurements and locations of the associated manual user input events; and an implicit calibration phase to recalibrate the stream of gaze measurements by:
  detecting manual user input events and extracting, from the stream of measurements, gaze measurements associated with the manual user inputs;
  checking if locations of the manual user input events are within a range of the associated gaze measurements;
  populating the recalibration buffer with indications of the locations and the associated gaze measurements if the locations of the manual user input events are within a range of the associated gaze measurements;
  identifying indications of locations and associated gaze measurements in the recalibration buffer that meet spatial distribution criteria; and
  using the indications of the locations and the associated gaze measurements that meet the spatial distribution criteria to recalibrate the stream of gaze measurements.

12. The gaze calibration module of claim 11 wherein the implicit calibration phase is executed without disturbing other interaction of the user with the computing device.

13. The gaze calibration module of claim 12 arranged to repeat the explicit calibration phase on the basis of monitored manual input events or when user input requesting explicit calibration is received.

14. A gaze tracker comprising the calibration module of claim 11.

15. The calibration module of claim 11 being at least partially implemented using hardware logic selected from any one or more of: a field-programmable gate array, a program-specific integrated circuit, a program-specific standard product, a system-on-a-chip, a complex programmable logic device.

* * * * *